Sept. 23, 1924.

L. J. STEPHENSON 1,509,114

CONTROL SYSTEM FOR ELECTRIC MOTORS

Filed July 20, 1921

Inventor: L. J. Stephenson
Williams, Bradbury,
See & McCabb
Attys

Patented Sept. 23, 1924.

1,509,114

UNITED STATES PATENT OFFICE.

LEIGH J. STEPHENSON, OF CHICAGO, ILLINOIS, ASSIGNOR TO B. V. BECKER, LEIGH J. STEPHENSON, GEORGE B. BURRAGE, WILLIAM T. FENTON, AND LYNN A. WILLIAMS, TRUSTEES, ALL OF CHICAGO, ILLINOIS.

CONTROL SYSTEM FOR ELECTRIC MOTORS.

Application filed July 20, 1921. Serial No. 486,244.

*To all whom it may concern:*

Be it known that I, LEIGH J. STEPHENSON, a citizen of the United States, and resident of Chicago, in the county of Cook and State of Illinois, have invented a certain new and useful Improvement in Control Systems for Electric Motors, of which the following is a full, clear, concise, and exact description, reference being had to the accompanying drawings, forming a part of this specification.

My invention relates to improvements in control systems for electric motors, and is particularly concerned with the provision of novel means for quickly reversing the direction of rotation of an electric motor embodying a shunt field winding.

The principal object of my invention is to provide simple means for quickly reversing an electric motor embodying a shunt field winding, or, specifically, my invention comprises means for first exciting the field of an electric motor beyond its normal field strength due to full line voltage, then reversing the direction of current through the armature of the motor, and subsequently weakening the excitation of the motor to cause the motor to rapidly accelerate in a direction opposite to its former direction of rotation.

I have illustrated my present invention as embodying the system of control described and claimed in my Reissue Patent Number 14,787, of January 6, 1920. My invention is not, however, limited to the use of the system of control claimed in my aforesaid patent.

In addition to the objects expressed above, other objects will appear as this description progresses, reference being had to the accompanying drawings in which—

Figure 1:
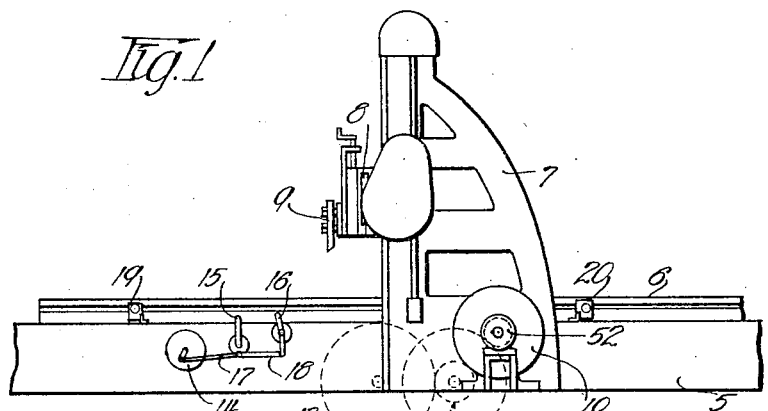
Figure 2:
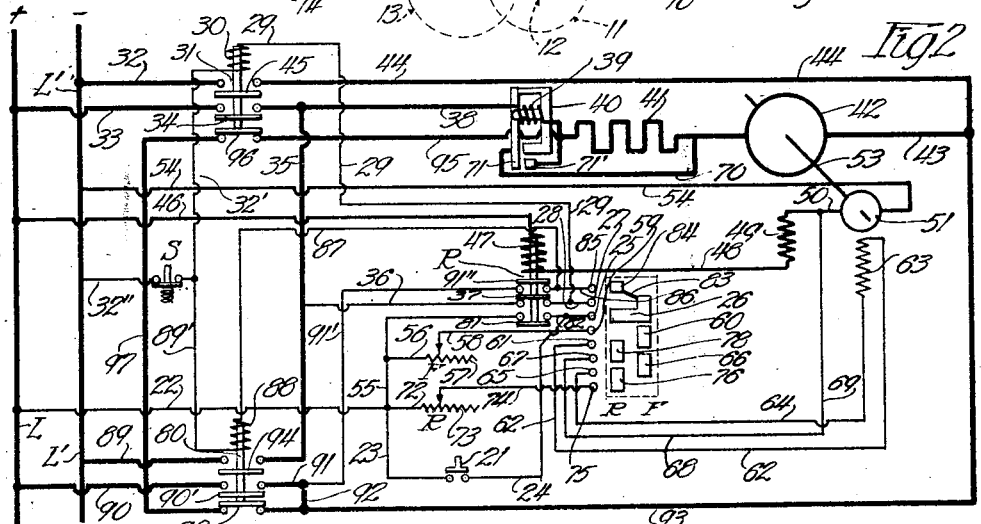
Figure 3:
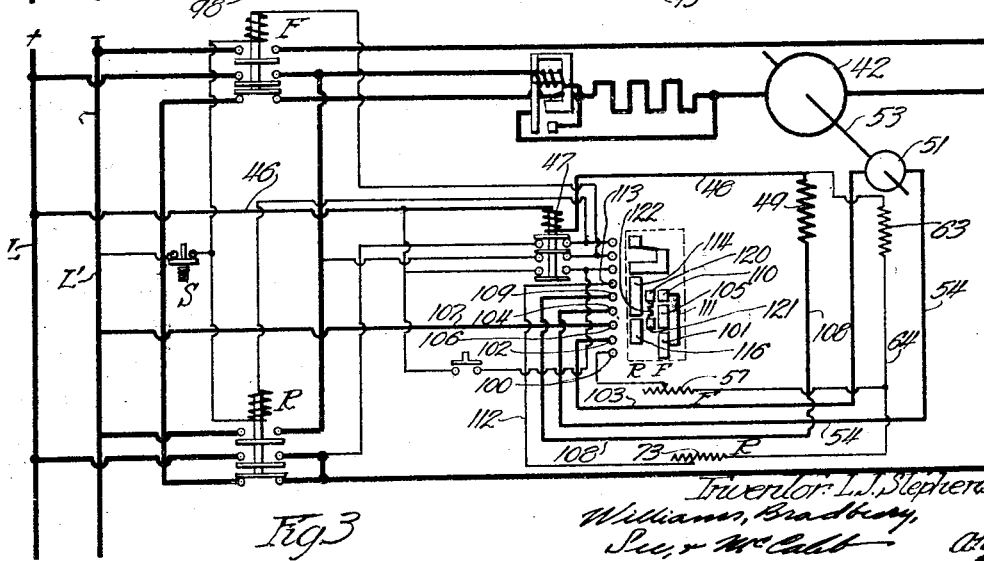

Figure 1 is a side elevation of a metal planer driven by an electric motor, the control system for which embodies my present invention, Figure 2 is a schematic diagram showing the electrical connection between the motor and the various parts of the control mechanism, and Figure 3 is a view similar to Figure 2, but showing a modified embodiment of my invention.

Throughout the several figures, similar reference characters will be used for referring to similar parts.

In the following description I have illustrated my invention in connection with a metal planer of conventional type. It is to be clearly understood that my invention is in no way limited to this particular use, but is capable of being used for driving any machine or device wherein the direction of movement or any element or elements is periodically reversed.

Referring for the present to Figures 1 and 2, I have illustrated a metal planer comprising the bed 5 and a work carrying table 6 which is reciprocally mounted upon the bed 5. Uprights 7 at each side of the bed 5 carry the cross rail 8 upon which is adjustably mounted a tool 9 which engages the work. The work carrying table 6 is connected in driving relation with the motor 10 through suitable spur gearing 11, 12 and 13, in the usual manner.

A master controller drum 14 may be suitably mounted upon the bed 5 of the planer, and is actuated through its forward or reverse positions by means of the triggers 15 and 16 connected with the drum 14 by means of the links 17 and 18. The triggers 15 and 16 are adapted to be engaged by the dogs 19 and 20 adjustably mounted upon the side of the work carrying table 6. The construction thus far described is more or less conventional and forms no part of my present invention except as the parts thereof coact with the control system about to be described.

I shall continue the description of my invention in connection with its mode of operation.

Assuming that the master controller 14 is set in its forward position, the machine is set in motion by pressing the push button 21 which closes a circuit from the main L through the conductors 22 and 23, push button 21, conductor 24, stationary contact 25, drum contact 26, stationary contact 27, conductors 28 and 29, through the solenoid 30 of the magnetic contactor 31, conductor 32', push button S and conductor 32" back to main L'.

When the solenoid 30 is energized, a holding circuit for the magnetic contactor 31 is completed from the main L through the conductor 33, contact 34 of the magnetic contactor, conductors 35 and 36, contact 37 of the relay R which is in its down position, conductor 29, solenoid 30, conductor 32', push button S and conductor 32" back to the line L'. The magnetic contactor 31 is thus held in its closed position even after the push button 21 returns to its normal position.

As soon as the magnetic contactor 31 is closed, current flows through the armature of the motor through the following circuit:

Main L, conductor 33, contact 34, conductor 38, solenoid 39 of the magnetic lockout accelerating switch 40, starting resistance 41, armature 42 of the motor 10, conductors 43 and 44, contact 45 of the magnetic contactor 31, and conductor 32 back to main L'.

Current is supplied to the field winding of the motor 10 through the following circuit:

Main L, conductor 46, solenoid 47 of the relay R, conductor 48, shunt field winding 49 for the motor 10, conductor 50, armature 51 of the regulating dynamo 52 which is mounted upon the shaft 53 of the motor 10, and conductor 54, back to main L'.

At the same time the regulating dynamo is provided with a field through the following circuit:

Main L, conductors 22, 55 and 56, adjustable rheostat 57, conductor 58, stationary contact 59, drum contact 60, stationary contact 61, conductor 62, field winding 63, conductor 64, stationary contact 65, drum contact 66, stationary contact 67, conductors 68, 69 and 50, through the armature 51 of the regulating dynamo, and conductor 54, back to main L'.

With the circuit thus far described, the motor begins to accelerate in a forward direction and continues to thus accelerate until the current through the armature circuit of the motor diminishes to a predetermined value, whereupon the starting resistance 41 is short circuited through the conductor 70 and the contacts 71 and 71' of the magnetic lockout accelerating switch 40. The motor then continues to accelerate due to the action of the regulating dynamo in weakening the field of the motor in the manner described in my reissue patent referred to above. Its maximum speed is determined by the setting of the rheostat 57.

The work carrying table is thus moved in forward direction until the dog 19 engages the trigger 15 and causes the master controller to be moved to its reverse position, whereupon the field of the regulating dynamo is reversed through the following circuit:

Main L, conductors 22 and 72, adjustable rheostat 73, conductor 74, stationary contact 75, drum contact 76, stationary contact 65, conductor 64, field winding 63, conductor 62, stationary contact 61, drum contact 78, stationary contact 67, conductors 68, 69 and 50, armature 51 of the regulating dynamo, and conductor 54, back to main L'.

The reversal of current through field winding 63 causes the field of the regulating dynamo to rapidly diminish and build up in the opposite direction, which causes the voltage of the regulating dynamo to be reversed in direction so that it now adds to the line voltage in place of opposing it as formerly, and thus causes an exceedingly rapid building up of the fields of the regulating dynamo and of the motor. By thus building the strength of the motor field up to an exceedingly high value, the generated electromotive force of the motor is caused to exceed the line voltage and its speed is quickly reduced through the regenerated braking thus produced. When the current in the field winding 49 is building up to a predetermined value, preferably above normal full field current, the solenoid 47 of the relay R will lift the relay, thereby opening the circuit through the solenoid 30 of the magnetic contactor 31 and causing this contactor to open, and at the same time actuating the magnetic contactor 80 through the following circuit;

Main L, conductors 22 and 55, contact 81 of the relay R, conductor 82, stationary contact 25, drum contact 26, conductor 83, drum contact 84, stationary contact 85, conductors 86 and 87, solenoid 88 of the magnetic contactor 80, conductor 89', push button S, and conductor 32" to main L'.

The solenoid 88 being thus energized, the magnetic contactor 80 closes and a holding circuit for the magnetic contactor 80 is thus established as follows:

Main L, conductor 90, contact 90', conductors 91 and 91', contact 37, conductor 87, solenoid 88, conductor 89', push button S, and conductor 32", to main L'.

The reverse circuit through the motor is as follows:

Main L, conductor 90, contact 90', conductors 91, 92 93 and 43, armature 42, starting resistance 41, solenoid 39, conductors 38 and 35, contact 94, and conductor 89, to main L'. It should be noted that when the current in the solenoid 47 fails sufficiently to permit the plunger or armature therein to drop downwardly, contact 91" completes the circuit between conductors 91' and 87, and thereby maintains the energization of solenoid 88 so as to prevent the motor circuit from being opened.

The direction of current through the armature of the motor having thus been reversed, it will quickly come to a standstill and accelerate in the opposite direction to a speed which is determined by the setting of the adjustable rheostat 73. Upon the completion of the reverse stroke, the dog 20 will again engage the trigger 16 and cause the controller to be moved to its forward position, whereupon the operations described above will be repeated, these forward and reverse operations thus being automatically repeated as long as the motor is in operation.

If for any reason the line voltage should fail, dynamic braking is accomplished through the following circuit, both contactors under these conditions being down:

Armature 42 of the motor, starting resistance 41, conductor 95, contact 96, conductor 97, contact 98, conductors 93 and 43, back to the armature 42.

To stop the motor, it is necessary simply to operate push buttons S, thereby opening the holding circuits of the solenoids 30 and 88, and thus permitting the magnetic contactors 31 and 80 to open, thereby disconnecting the motor from the line.

In Figure 3 I have illustrated a modified form of my invention wherein the direction of the voltage of the regulating dynamo 52 is reversed by reversing its terminal connections in place of by reversing its excitation. In this embodiment of my invention, the field circuit for the regulating dynamo for the forward position of the master controller is as follows:

From main L, through conductor 46, solenoid 47, conductor 48, field winding 63, conductor 64, adjustable rheostat 57, stationary contact 100, drum contact 101, stationary contact 102, conductor 103, armature 51 of the regulating dynamo, conductor 54, stationary contact 104, drum contact 105, stationary contact 106, and conductor 107, to line L'.

The corresponding circuit through the field winding of the motor is as follows:

Main L, conductor 46, solenoid 47, conductor 48, field winding 49, conductor 108, stationary contact 109, drum contact 110, conductor 111, drum contact 101, stationary contact 102, conductor 103, armature 51 of the regulating dynamo, conductor 54, stationary contact 104, drum contact 105, stationary contact 106, and conductor 107, to line L'.

For the reverse position of the master controller, the circuit through the field 63 of the regulating dynamo is as follows:

Main L, conductor 46, solenoid 47, conductor 48, field winding 63, conductor 64, adjustable rheostat 73, conductor 112, stationary contact 113, drum contact 114, stationary contact 104, conductor 54, armature 51, conductor 103, stationary contact 102, drum contact 116, stationary contact 106, and conductor 107, to main L'.

The corresponding circuit through the field winding 49 of the motor is as follows:

Main L, conductor 46, solenoid 47, conductor 48, field winding 49, conductor 108, stationary contact 109, drum contact 114, stationary contact 104, conductor 54, armature 51, conductor 103, stationary contact 102, drum contact 116, stationary contact 106, and conductor 107, to main L'.

I have illustrated the master controller as being provided with two contacts 120 and 121 respectively, which are connected by the resistance 122. The function of these contacts and resistance is to short circuit the armature of the regulating dynamo while its terminals are being reversed so as to prevent the circuit of the shunt field of the motor from being opened during the reversal of the regulating dynamo. This resistance is made sufficiently large to prevent excessive short circuit currents from being generated in the regulating dynamo armature during its reversal.

Aside from the changes indicated above, the wiring connections in Figure 3 are the same as those in Figure 2 and the mode of operation is substantially identical.

From the above description, it will be seen that prior to the reversal of a current in the armature of the motor, the voltage of the regulating dynamo is reversed so that in place of opposing the line voltage impressed upon the field winding circuit of the motor formed by the field winding of the motor and the regulating dynamo, it assists or adds to the line voltage impressed upon this circuit, as a result of which the voltage impressed upon the field winding circuit will very materially exceed line voltage, and thereby cause, first, a rapid increase in the excitation of the motor which causes the motor to rapidly slow down through regenerative braking. The current through the armature of the motor is then reversed, thereupon rapidly bringing it to a stop and causing it to accelerate in the opposite direction.

The reversal in the direction of rotation of the motor armature causes a similar reversal in the direction of rotation of the regulating dynamo armature, and a corresponding reversal in the direction of its voltage which causes the field of the motor to be rapidly weakened and the motor to rapidly accelerate.

By increasing the voltage impressed upon the field winding of the motor to a value above line voltage, I am enabled to greatly decrease the time required to build up the motor field to normal or full field below the time required when only line voltage is available.

While I have described the details of the preferred embodiment of my invention, it is to be clearly understood that my invention is not to be limited to these details, and that it is capable of other adaptations and modifications from that specifically described herein.

Having thus described my invention, what I claim is:

1. The combination with a machine, of a motor connected to drive said machine, a shunt field winding for said motor, a regulating dynamo connected in series with said shunt field winding to form a field winding circuit, means for impressing an electromotive force upon said field winding circuit, a field winding for said regulating dynamo, and controlling means operated by an element of said machine for reversing the direction of current through the field winding of said regulating dynamo, and for subsequently reversing the direction of current through the armature of said motor.

2. The combination with a machine, of a motor connected to drive said machine, a shunt field winding for said motor, a regulating dynamo connected in series with said shunt field winding to form a field winding circuit, means for impressing an electromotive force upon said field winding circuit, a field winding for said regulating dynamo, and controlling means operated by an element of said machine for reversing the direction of current through the field winding of said regulating dynamo and for reversing the direction of current through the armature of said motor.

3. The combination with a motor having a shunt field winding, of a regulating dynamo connected in series with said shunt field winding to form a field winding circuit, means for impressing an electromotive force upon said field winding circuit, a field winding for said regulating dynamo, and controlling means for reversing the direction of current through the field winding of said regulating dynamo, and for subsequently reversing the direction of current through the armature of said motor.

4. The combination with a motor having a shunt field winding, of a regulating dynamo connected in series with said shunt field winding to form a field winding circuit, means for impressing an electromotive force upon said field winding circuit, a field winding for said regulating dynamo, and controlling means for reversing the direction of current through the field winding of said regulating dynamo, and for reversing the direction of current through the armature of said motor.

5. The method of quickly reversing the direction of rotation of an electric motor which comprises, increasing the excitation above the normal field strength due to full line voltage, subsequently reversing the direction of current through the armature of said motor, and then decreasing the excitation below said normal field strength.

6. The combination with a supply circuit, of a dynamo electric machine comprising a magnetic field circuit and a field winding for said magnetic field circuit, and means for forcing the rapid building up of the magnetization in said magnetic field circuit comprising means for applying to said field winding terminals an electromotive force greater than the electromotive force of said supply circuit, and means for subsequently reversing the direction of current through the armature of said dynamo electric machine.

In witness whereof, I hereunto subscribe my name this 13th day of July, 1921.

LEIGH J. STEPHENSON.

Witnesses:
ALBIN C. AHLBERG,
EMILE J. BOURGEOIS.